(12) United States Patent
Yu et al.

(10) Patent No.: US 8,378,889 B2
(45) Date of Patent: Feb. 19, 2013

(54) CALCULATING NAVIGATION SYSTEM TIME IN A SATELLITE NAVIGATION SYSTEM

(75) Inventors: Xiaoguang Yu, Wuhan (CN); Sterling Du, Palo Alto, CA (US); Haiquan Huang, Sichuan (CN)

(73) Assignee: 02MICRO Inc, Santa Clara, CA (US)

( * ) Notice: Subject to any disclaimer, the term of this patent is extended or adjusted under 35 U.S.C. 154(b) by 260 days.

(21) Appl. No.: 12/415,048

(22) Filed: Mar. 31, 2009

(65) Prior Publication Data

US 2010/0073230 A1     Mar. 25, 2010

Related U.S. Application Data

(60) Provisional application No. 61/188,446, filed on Aug. 8, 2008.

(51) Int. Cl.
*G01S 19/23* (2010.01)
(52) U.S. Cl. .................................. 342/357.62
(58) Field of Classification Search ............. 342/357.62
See application file for complete search history.

(56) References Cited

U.S. PATENT DOCUMENTS

| | | | | |
|---|---|---|---|---|
| 4,009,402 A | * | 2/1977 | Miller | 327/174 |
| 4,337,463 A | * | 6/1982 | Vangen | 340/825.2 |
| 5,418,573 A | * | 5/1995 | Basile et al. | 348/536 |
| 5,945,944 A | * | 8/1999 | Krasner | 342/357.46 |
| 6,023,477 A | * | 2/2000 | Dent | 370/509 |
| 6,389,291 B1 | * | 5/2002 | Pande et al. | 455/456.5 |
| 6,427,120 B1 | * | 7/2002 | Garin et al. | 701/213 |
| 6,829,534 B2 | * | 12/2004 | Fuchs et al. | 701/213 |
| 7,236,883 B2 | * | 6/2007 | Garin et al. | 701/213 |
| 7,456,782 B2 | * | 11/2008 | Wang et al. | 342/357.32 |
| 2007/0268180 A1 | | 11/2007 | Zhi et al. | |
| 2009/0066567 A1 | | 3/2009 | Huang et al. | |

FOREIGN PATENT DOCUMENTS

WO         02067439 A1      8/2002

OTHER PUBLICATIONS

EP 09166695, extented European Search Report, European Patent Office Dec. 2, 2009.
Parkinson B W et al., "Global Positioning System: Theory and Applications, GPS Receivers" Global Positioning System: Theory and Applications; Jan. 1, 1994.

* cited by examiner

*Primary Examiner* — Jack W Keith
*Assistant Examiner* — Frank J McGue (57) ABSTRACT

A satellite navigation system receiver that includes a counter and a controlling unit is described. The counter may be driven by a reference clock signal having a reference clock frequency. The controlling unit can calculate a correction value indicative of a corrected reference clock frequency by comparing an increment of the counter values during a time period with an increment of the navigation system times during the time period. The controlling unit can generate a calculated navigation system time according to the correction value.

21 Claims, 6 Drawing Sheets

CALCULATING NAVIGATION SYSTEM TIME IN A SATELLITE NAVIGATION SYSTEM

RELATED APPLICATIONS

This application claims priority to U.S. Provisional Application No. 61/188,446, filed on Aug. 8, 2008, which is hereby incorporated by reference in its entirety.

BACKGROUND

The Global Positioning System (GPS) is a satellite-based system used to provide positional information for GPS receivers. The GPS system is enabled using at least 24 satellites orbiting around earth at a period about 12 hours and by a plurality of ground control stations.

The data broadcast by a GPS satellite is known as a navigation message. The navigation message can include information such as ephemeris, almanac, a satellite time (the time onboard the satellite), and a time difference relative to a GPS system time (a standard time used as a reference time across the system). The time difference between the satellite time and the GPS system time is relatively stable, and can be stored by the GPS receiver. At the GPS receiver, the GPS system time can be obtained based on the satellite time, a previous position result of the GPS receiver, and the pre-stored time difference between the satellite time and the GPS system time. The previous position result of the GPS receiver indicates a previous position of the GPS receiver, and can be used to determine a transmission time delay based on the distance between the satellite and the GPS receiver. As such, the GPS system time can be obtained by adding up the GPS satellite time, the transmission time delay and the time difference.

The navigation message is formed by a sequence of navigation data bits. The end of a data bit, which is also the beginning of another data bit, is referred to as a navigation bit boundary. The navigation data message is transmitted on a frame basis and each frame is 1500 bits long. It takes about 20 milliseconds (ms) to transmit a data bit, and so it takes about 30 seconds to transmit a frame. Each frame is divided into five sub-frames, where each sub-frame has 300 navigation data bits. Each satellite begins to transmit a frame precisely on the minute and on the half minute, according to its satellite time. Before transmission, the navigation message is first modulated with a high rate repetitive pseudo-random noise (PRN) code and then is further modulated with a high frequency carrier signal.

At a GPS receiver, a received GPS signal is first down-converted to a signal with a desired frequency and then digitized at a predetermined sampling rate. The converted and digitized signal is known as a digital intermediate frequency (IF) signal. After the digital IF signal is demodulated by stripping off the carrier signal and the PRN code, the navigation message can be retrieved. In order to obtain the information from the navigation message, the navigation bit boundaries have to be determined by the GPS receiver.

The GPS receiver may need to obtain information from at least four satellites to calculate a current position of the GPS receiver. A parameter known as the time to first fix (TTFF) can indicate the time delay from the time when the GPS receiver is powered on to the time when the GPS receiver determines a current position.

Figure 1:
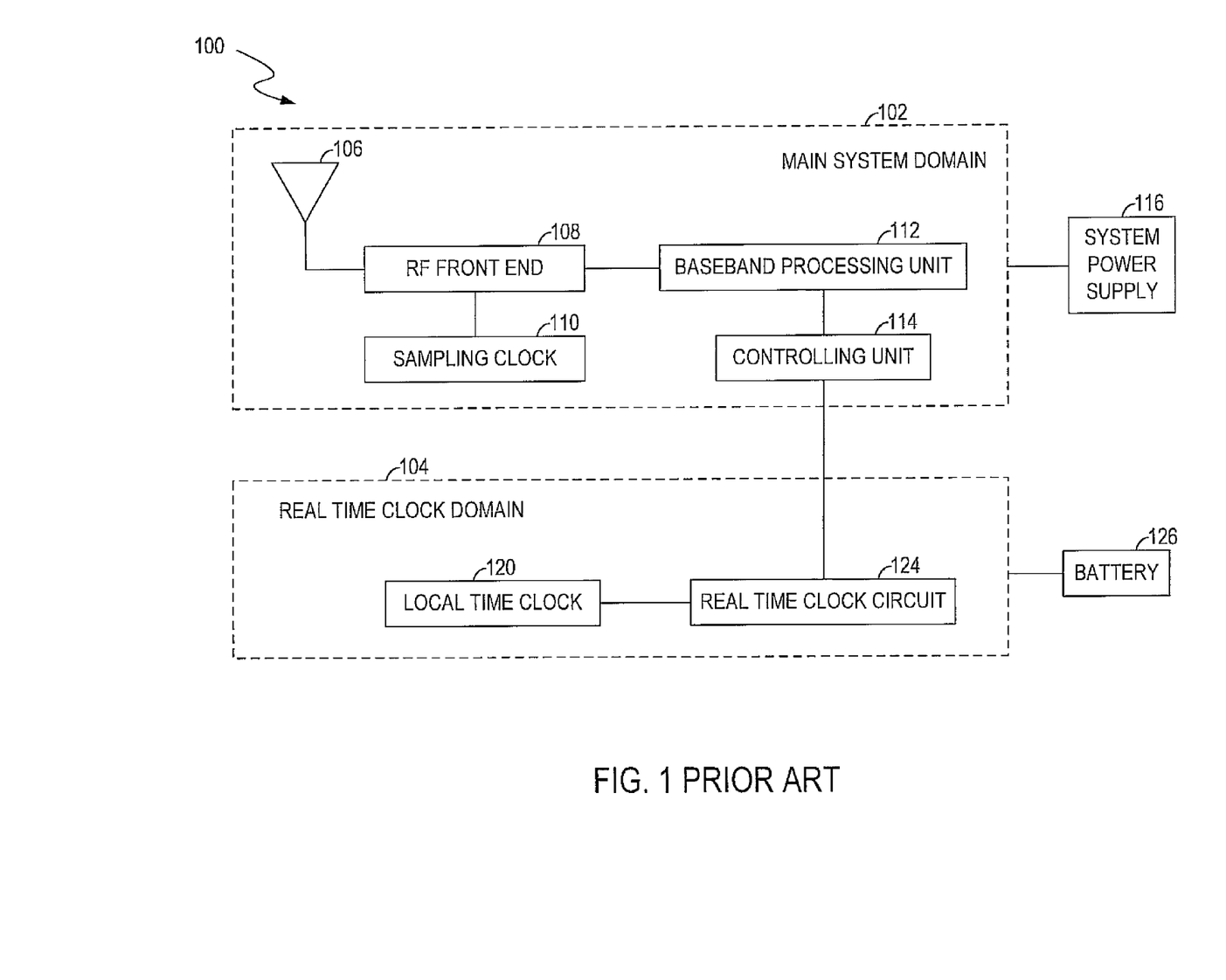
FIG. 1 shows a block diagram of a conventional GPS receiver.

FIG. 1 shows a block diagram of a conventional GPS receiver 100. The GPS receiver 100 can be divided into a main system domain 102 and a real clock domain 104.

In the main system domain 102, an antenna 106 receives a GPS signal and forwards the GPS signal to a radio frequency (RF) front end 108. At the RF front end 108, the GPS signal is converted to a signal with a desired frequency and then digitized at a predetermined sampling rate by a sampling clock 110 to generate a digital IF signal. A baseband processing unit 112 can process the digital IF signal under the control of a controlling unit 114 to perform various functions such as acquisition, tracking and positioning. The components in the main system domain 102 are powered by a system power supply 116.

In the real time clock domain 104, a local time clock 120 can be used for driving a real time clock circuit 124. The real time clock circuit 124 can generate a local time (e.g., a time which can indicate the current year, month, day, hour, minute and second). The components in the real time clock domain 104 are powered by a battery 126.

Generally, the local time provided by the real time clock circuit 124 is a coarse time with second level resolution. When the GPS receiver 100 is powered off, the real time clock circuit 124 which is powered by the battery 126 continues generating the local time. When the GPS receiver 100 is powered on, the local time with second level resolution can be used to determine the visibility of GPS satellites, that is, which satellites are available to the GPS receiver 100. Then the GPS receiver 100 starts to acquire a GPS signal. In order to obtain the information from the navigation massage of the GPS signal to calculate a current position, the GPS receiver 100 needs to determine navigation bit boundaries of the navigation message.

Conventionally, the process to determine navigation bit boundaries involves a calculation which may include generating a plurality of integration results where each integration result corresponds to a possible position of a bit boundary. Then the position of the bit boundary may be determined by comparing the integration results. Such a conventional process may be time-consuming and the time to first fix (TTFF) may be increased.

Furthermore, such a conventional process may require that the signal to noise ratio (SNR) of the received GPS signal is higher than a predetermined level (e.g., 26 db-Hz in a conventional method). Therefore, for a weak GPS signal, the GPS receiver 100 may not be able to obtain the information from the navigation message so that the TTFF may be increased.

SUMMARY

A satellite navigation system receiver that includes a counter and a controlling unit is described. The counter can be driven by a reference clock signal having a reference clock frequency. The controlling unit can calculate a correction value indicative of a corrected reference clock frequency by comparing an increment of the counter values during a time period with an increment of the navigation system times during the time period. The controlling unit can also generate a calculated navigation system time according to the correction value.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "generating", "calculating", "employing", "determining", "driving", "digitizing" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although embodiments of the present invention are discussed in the context of a GPS system, the embodiments are also applicable to other satellite navigation systems.

Figure 2:
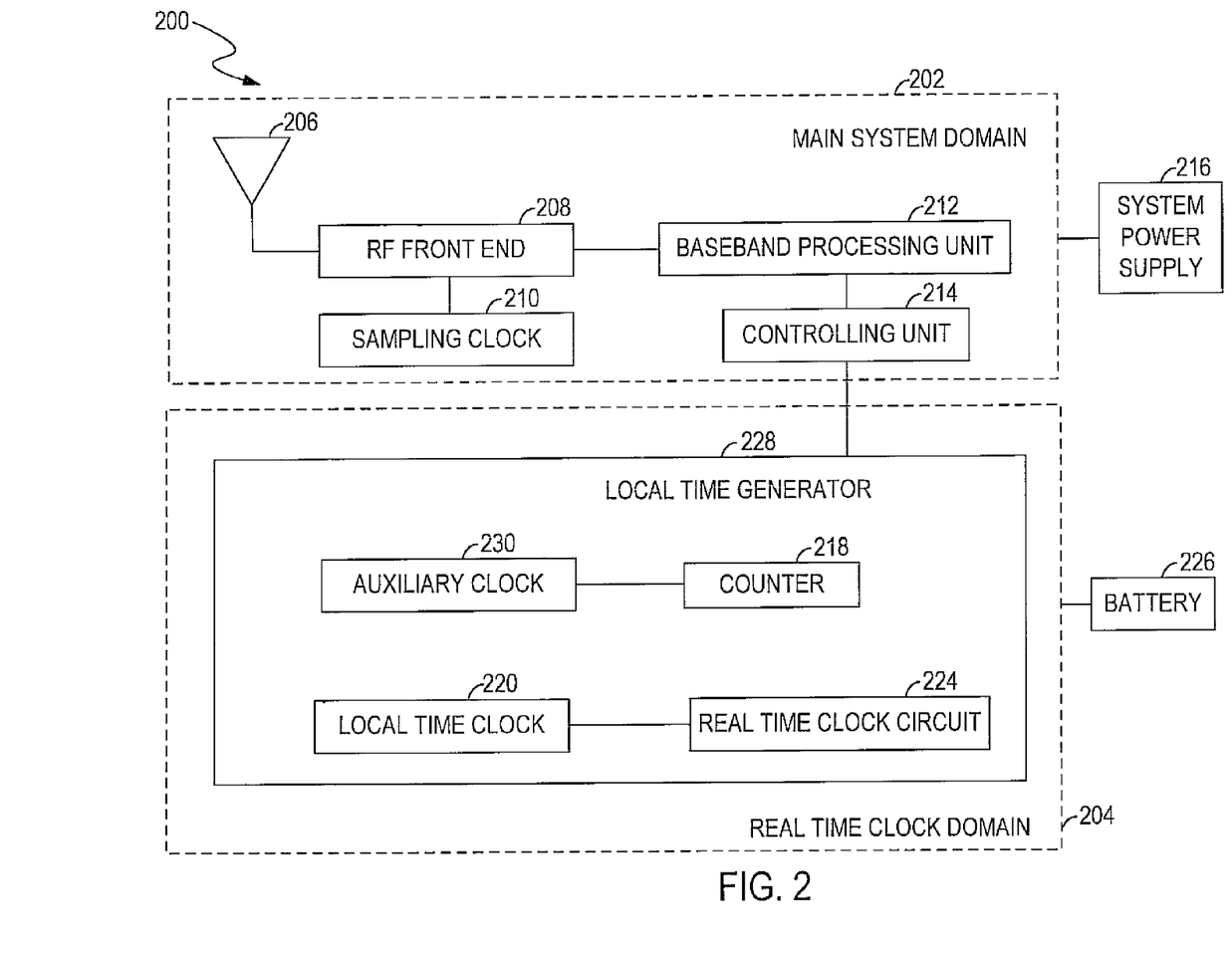
FIG. 2 shows a block diagram of a GPS receiver in accordance with one embodiment of the present invention.

FIG. 2 shows a block diagram of a satellite navigation system (SNS) receiver, such as a GPS receiver 200, in accordance with one embodiment of the present invention. The GPS receiver 200 can be divided into a main system domain 202 and a real time clock domain 204.

In the main system domain 202, an antenna 206 receives a satellite signal, such as a GPS signal, from a satellite and forwards the GPS signal to a radio frequency (RF) front end 208. At the RF front end 208, the GPS signal is down-converted to a signal with a desired frequency and then digitized at a predetermined sampling rate by a sampling clock 210 to generate a digital intermediate frequency (IF) signal. A baseband processing unit 212 can process the digital IF signal under the control of a controlling unit 214 to perform various functions such as acquiring GPS signals, tracking GPS signals and calculating a current position of the GPS receiver 200. The controlling unit 214 can include, but is not limited to, a central processing unit (CPU), or a microcontroller unit (MCU). In the example shown in FIG. 2, the controlling unit 214 is implemented outside the baseband processing unit 212. In another embodiment, the controlling unit 214 can be integrated within the baseband processing unit 212. The components in the main system domain 202 can be powered by a first power supply (e.g., a system power supply 216).

In the real time clock domain 204, a local time generator 228 is operable for providing time information for the GPS receiver 200. In one embodiment, the local time generator 228 includes an auxiliary clock 230 for providing a reference clock signal having a reference clock frequency, a counter 218 driven by the auxiliary clock 230 for providing counter values, and a local time clock 220 for generating a local time clock signal for driving a real time clock circuit 224. In one embodiment, the counter value of the counter 218 increases by one (1) in response to each clock pulse of the reference clock signal generated by the auxiliary clock 230.

The real time clock circuit 224 can provide a local time (e.g., a time which can indicate the current year, month, day, hour, minute and second). The local time generated by the real time clock circuit 224 can be used to determine the visibility of GPS satellites, and can also be used to determine if the counter values are correct. For example, if the counter value exceeds a desired/predetermined range when a predetermined time period expires according to the local time, then the counter value may be in error. The components in the real time clock domain 204 can be powered by a second power supply (e.g., a battery 226).

Although the reference clock frequency of the reference clock signal may have a nominal value, there is usually a difference (or offset) between the nominal value of the frequency and the practical value of the frequency. The difference can accumulate over time, and thus an error of time can be increased when measuring a time period by the reference clock signal. According to an embodiment of the present invention, the reference clock frequency can be corrected by generating a correction value which can indicate a corrected reference clock frequency. In one embodiment, the controlling unit 214 can calculate the correction value, for example by comparing an increment of the counter values of the counter 218 during a time period with an increment of the GPS system times during the time period. GPS system times can be obtained based on the information from the navigation message and previous position results in a conventional manner. The controlling unit 214 can further generate a calculated GPS system time according to the correction value. The calculated GPS system time can be employed during the calculation of a current position result to decrease Time To First Fix (TTFF) of the GPS receiver 200.

The controlling unit 214 monitors the GPS system time and the counter value of counter 218, and calculates the correction value $f_{correct}$ indicative of a corrected reference clock frequency. In one embodiment, the correction value $f_{correct}$ is obtained by calculating an average refresh rate of the counter value over a particular period of the GPS system time, which can be shown as equation (1):

$$f_{correct} = \frac{Counter_n - Counter_m}{GPS\_Time_n - GPS\_Time_m} \quad (1)$$

In equation (1), $Counter_m$ is a first counter value of counter 218 at a first time point $T_m$. $GPS\_Time_m$ represents a first GPS system time at the first time point $T_m$. $Counter_n$ is a second counter value of counter 218 at a second time point $T_n$. $GPS\_Time_n$ represents a second GPS system time at the second time point $T_n$. The GPS system time $GPS\_Time_m$ and $GPS\_Time_n$ can be obtained by the GPS receiver 200 based on the information from the navigation message and previous position results in a conventional manner, in one embodiment.

After the GPS receiver 200 is powered off, the system power supply 216 may stop supplying power to the components in the main system domain 202. However, the local time generator 228, which is powered by the battery 226, can continue working. The counter value of the counter 218 keeps increasing in response to each clock pulse of the reference clock signal generated by the auxiliary clock 230.

When the GPS receiver 200 is powered on again, the controlling unit 214 can generate a calculated GPS system time according to the average refresh rate of the counter values. In one embodiment, the calculated GPS system time is generated based on a third GPS system time, a third counter value, a fourth counter value and the correction value $f_{correct}$ according to equation (2):

$$CT_p = GPS\_Time_o + \frac{(Counter_p - Counter_o)}{f_{correct}} \quad (2)$$

In equation (2), $Counter_o$ is a third counter value of counter 218 at a third time point $T_o$. $GPS\_Time_o$ represents a third GPS system time at the third time point $T_o$. $Counter_p$ is a fourth counter value of counter 218 at the fourth time point $T_p$. The correction value $f_{correct}$ is generated according to equation (1). The GPS system time $GPS\_Time_o$ can be obtained by the GPS receiver 200 based on the information from the navigation message and previous position results in a conventional manner. $CT_p$ is the calculated GPS system time at the fourth time point $T_p$ which corresponds to the fourth counter value $Counter_p$.

In equation (1) and equation (2), time point $T_m$, time point $T_n$ and time point $T_o$ are time points before the GPS receiver 200 is powered off. Time point $T_n$ is later than time point $T_m$. Time point $T_p$ is a time point after the GPS receiver 200 is powered off and then powered on again. Time point $T_o$ can be the same time point as the time point $T_n$ ($T_o$ and $T_n$ overlap), or time point $T_o$ can be earlier or later than time point Tn.

Therefore, after the GPS receiver 200 is powered on again, a GPS system time $CT_p$ can be calculated according to equation (1) and equation (2). The calculated GPS system time $CT_p$ can have a resolution which is much higher than the resolution of the local time provided by the real time clock circuit 224. As such, the calculated GPS system time $CT_p$ can be used to determine a calculated satellite time based on the pre-stored time difference between the satellite time and the GPS system time. Navigation bit boundaries of the navigation message can be determined by the calculated satellite time. The calculated GPS system time $CT_p$ can also be used for other purposes such as determining the visibility of the satellites.

Each navigation satellite begins to transmit a frame precisely on the minute and on the half minute according to its satellite time, and the lasting time of each navigation data bit is 20 ms. A calculated satellite time can be obtained based on a calculated GPS system time because the time difference between the satellite time and the GPS system time is known. Advantageously, navigation bit boundaries of the navigation message can be determined based on the calculated GPS system time $CT_p$. As such, the TTFF of the GPS receiver 200 can be decreased because the conventional time-consuming integration and comparison process can be avoided.

Figure 3:
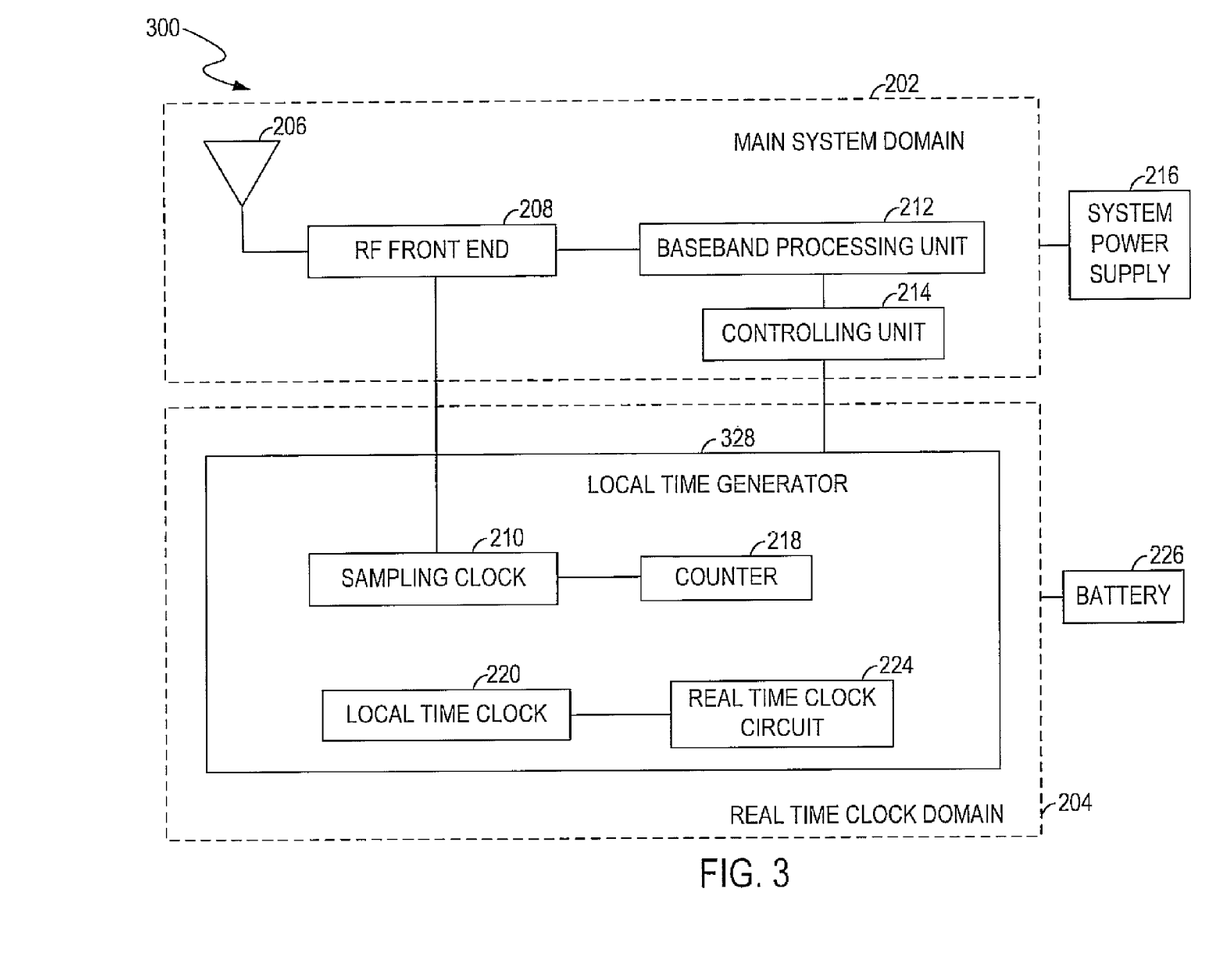
FIG. 3 shows a block diagram of a GPS receiver in accordance with one embodiment of the present invention.

FIG. 3 shows a block diagram of a satellite navigation system receiver, such as a GPS receiver 300, in accordance with one embodiment of the present invention. Elements labeled the same as in FIG. 2 have similar functions and will not be repetitively described herein. In the GPS receiver 300 shown in FIG. 3, a local time generator 328 further includes the sampling clock 210. The sampling clock 210 can be used for digitizing the received GPS signal when the GPS receiver 300 is powered on. Powered by the battery 226, the sampling clock 210 can also be used to continuously generate a reference clock signal which can be used to drive the counter 218 whether the GPS receiver 300 is powered on or powered off. Advantageously, the auxiliary clock 230 shown in FIG. 2 can be eliminated and system cost can be reduced.

Figure 4:
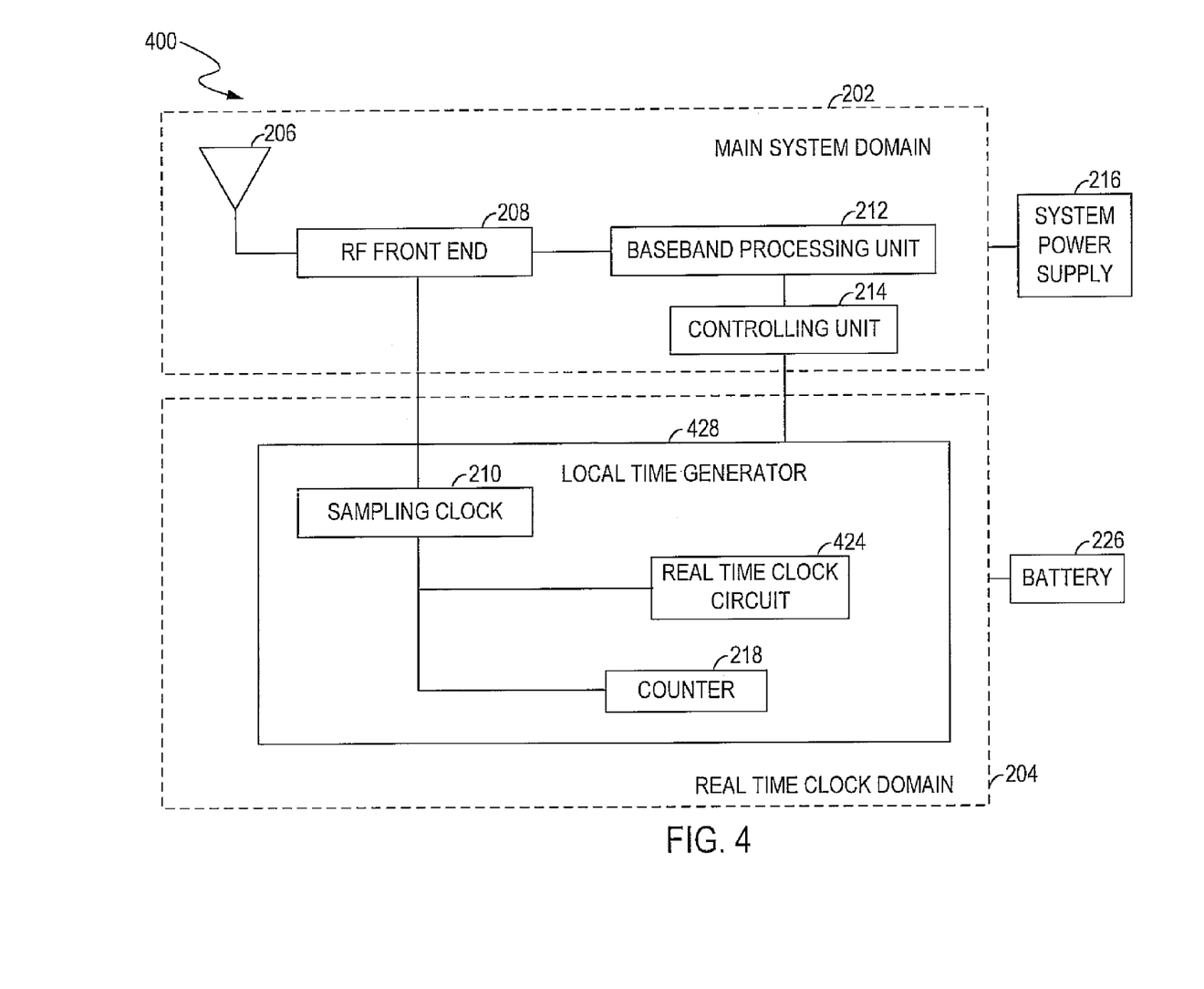
FIG. 4 shows a block diagram of a GPS receiver in accordance with one embodiment of the present invention.

FIG. 4 shows a block diagram of a satellite navigation system receiver, such as a GPS receiver 400, in accordance with one embodiment of the present invention. Elements labeled the same as in FIG. 2 and FIG. 3 have similar functions and will not be repetitively described herein. In the GPS receiver 400 shown in FIG. 4, a sampling clock 210 can be used to continuously drive the counter 218. The sampling clock 210 can be also used to drive a real time clock circuit 424. The real time clock circuit 424 can generate a local time (e.g., a time which can indicate the current year, month, day, hour, minute and second). Advantageously, the local time clock 220 shown in FIG. 3 can be eliminated and system cost can be further reduced.

Figure 5:
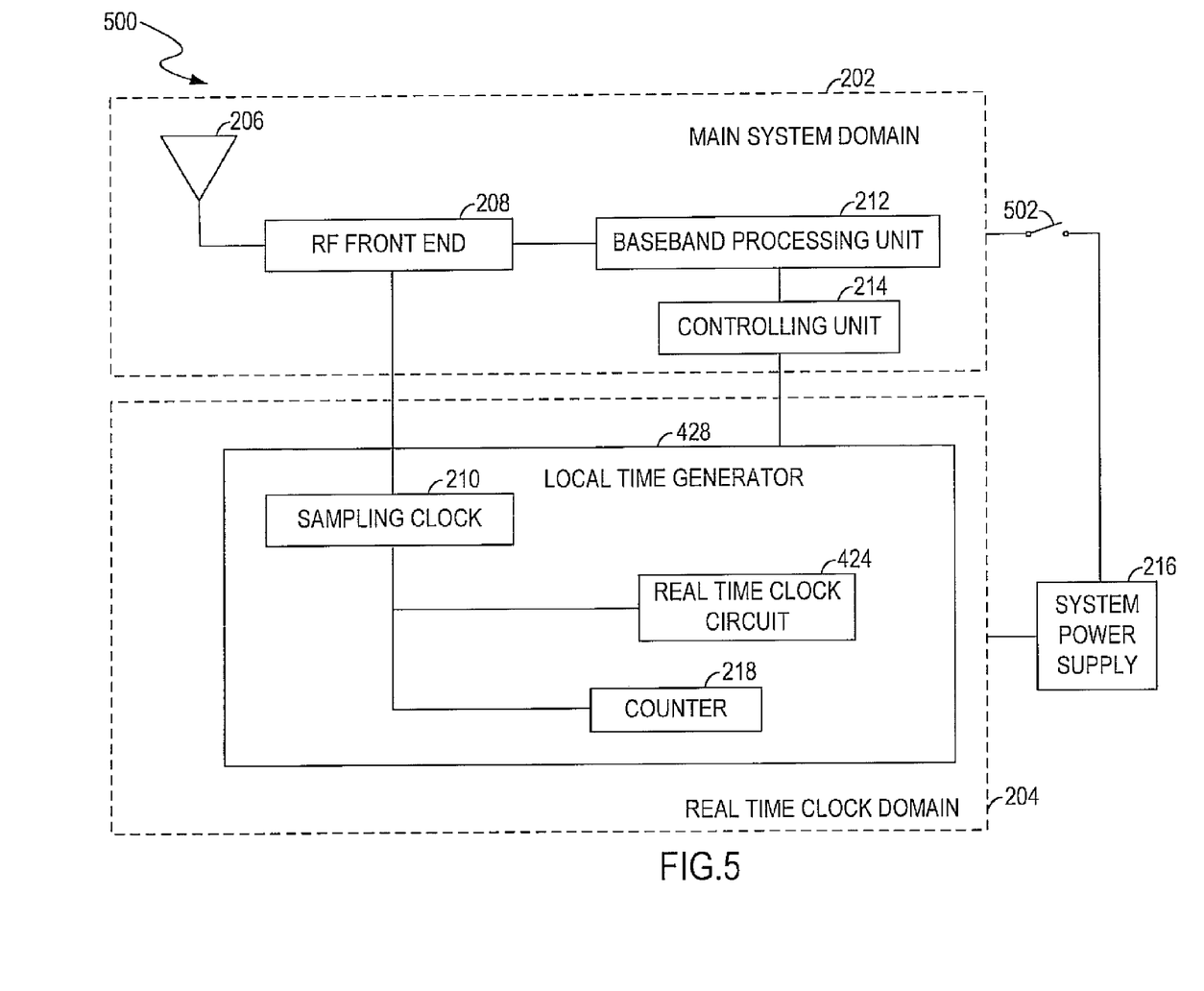
FIG. 5 shows a block diagram of a GPS receiver in accordance with one embodiment of the present invention.

FIG. 5 shows a block diagram of a satellite navigation system receiver, such as a GPS receiver 500, in accordance with one embodiment of the present invention. Elements labeled the same as in FIG. 4 have similar functions and will not be repetitively described herein. In the GPS receiver 500 shown in FIG. 5, the components in the main system domain 202 and the components in the real time clock domain 204 can be powered by a first power supply (e.g., a system power supply 216). A switch 502 is coupled between the main system domain 202 and the system power supply 216. When the GPS receiver 500 is powered on, the components in the main system domain 202 and the components in the real time clock domain 204 are powered by the system power supply 216. When the GPS receiver 500 is powered off, the switch 502 is turned off such that the power to the main system domain 202 is cut off. However, the components in the real time clock domain 204 can be continuously powered by the system power supply 216. Advantageously, a second power supply (e.g., the battery 226 shown in FIG. 4) can be eliminated and system cost can be further reduced.

Figure 6:
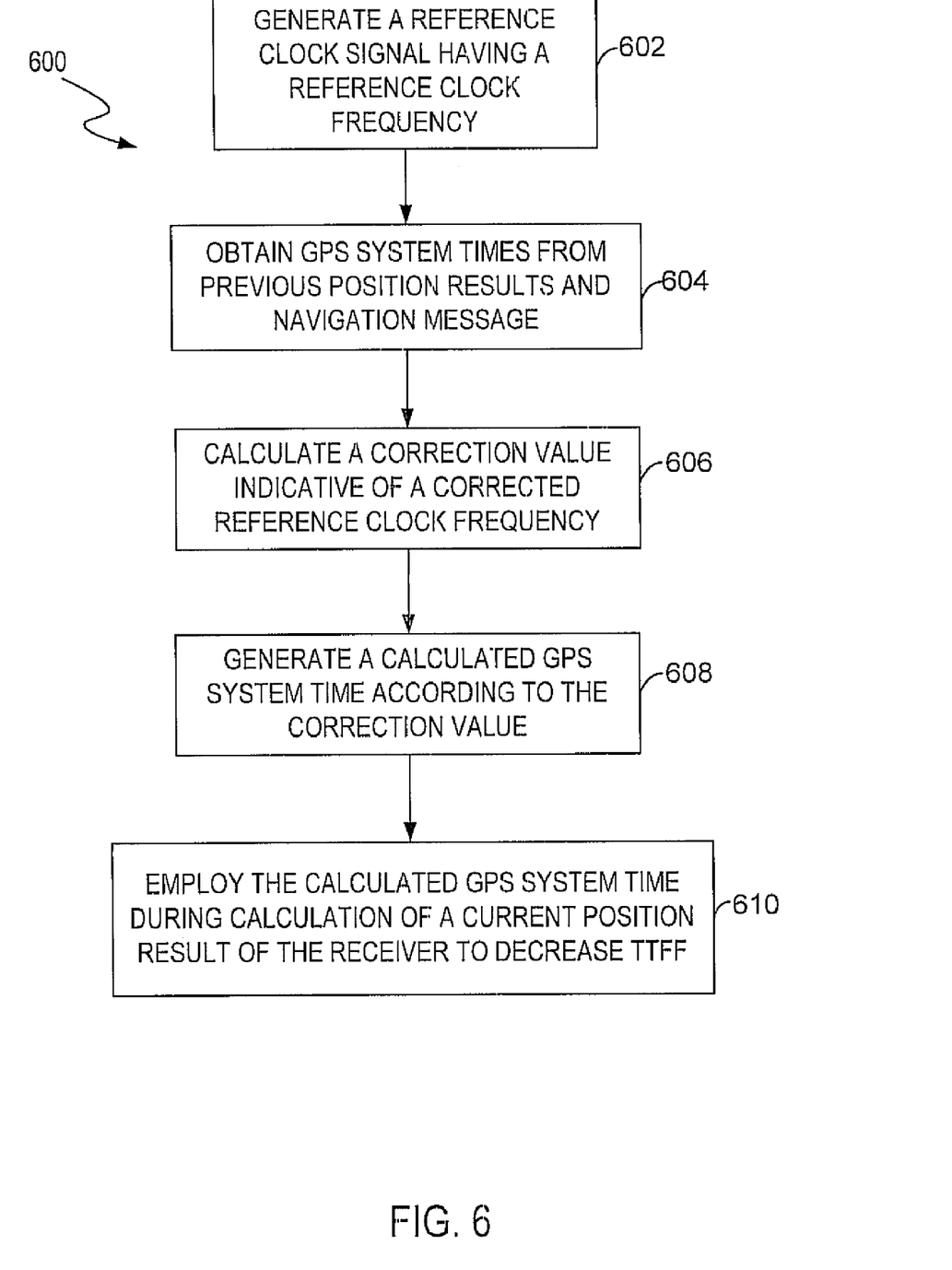
FIG. 6 shows a flowchart of a method for operations performed by a GPS receiver, in accordance with one embodiment of the present invention.

FIG. 6 shows a flowchart 600 of a method for operations performed by GPS receiver, in accordance with one embodiment of the present invention. Although specific steps are disclosed in FIG. 6, such steps are exemplary. That is, the present invention is well suited to performing various other steps or variations of the steps recited in FIG. 6. FIG. 6 is described in combination with FIG. 2, FIG. 3, FIG. 4 and FIG. 5.

In block 602, a reference clock signal having a reference clock frequency is generated by a clock, e.g., by the auxiliary clock 230 in FIG. 2 or by the sampling clock 210 in FIG. 3.

In block 604, GPS system times are obtained from previous position results and a navigation message in a conventional manner.

In block 606, a correction value indicative of a corrected reference clock frequency is calculated according to the reference clock signal and GPS system times by counting clock pulses of the reference clock signal over a particular period of the GPS system time. In one embodiment, a counter 218 is driven by the reference clock signal, and the correction value is calculated by comparing an increment of the counter values during a time period with an increment of the GPS system times during the time period.

In block 608, a calculated GPS system time is generated according to the correction value.

In block 610, the calculated GPS system time is employed during the calculation of a current position result of the GPS receiver to decrease TTFF. In one embodiment, the calculated GPS system time is employed to determine a calculated satellite time. The calculated satellite time can be used to determine navigation bit boundaries. In another embodiment, the calculated GPS system time is employed to determine visibility of satellites.

Accordingly, embodiments in accordance with the present invention provide GPS receivers that can correct a reference clock frequency of a locally generated reference clock signal.

In one embodiment, the GPS receivers can drive a counter by the reference clock signal, and compare an increment of the counter values during a time period with an increment of the GPS system times during the time period to generate a correction value indicative of a corrected reference clock frequency. Then a calculated GPS system time can be generated according to the correction value. Advantageously, as described above, after the GPS receivers are powered on again, navigation bit boundaries of the navigation message can be determined based on the calculated GPS system time in a relative efficient way. As such, the TTFF of the GPS receivers can be decreased.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A satellite navigation system receiver comprising:
a counter driven by a reference clock signal having a reference clock frequency to provide counter values, wherein said counter is operable for counting from a first time point to a second time point to generate a first increment of said counter values and for counting from a third time point to a fourth time point to generate a second increment of said counter values, wherein in a first interval from said first time point to said second time point said satellite navigation system receiver remains turned on, wherein in a second interval from said third time point to said fourth time point said satellite navigation system receiver is on then turned off and turned on again; and
a controlling unit coupled to said counter and operable for calculating a correction value indicative of a corrected reference clock frequency by dividing said first increment of said counter values during a time period by an increment of navigation system time during said time period, wherein said controlling unit is also operable for generating a calculated navigation system time according to said correction value, and said second increment of said counter values, and a navigation message from a satellite.

2. The receiver of claim 1, wherein said controlling unit calculates said correction value by calculating an average refresh rate of said counter values over a particular period of said navigation system time.

3. The receiver of claim 2, wherein said controlling unit generates said calculated navigation system time according to said average refresh rate of said counter values.

4. The receiver of claim 1, wherein said receiver is operable for determining navigation bit boundaries according to said calculated navigation system time.

5. The receiver of claim 1, wherein said receiver is operable for determining visibility of satellites according to said calculated navigation system time.

6. The receiver of claim 1, further comprising a sampling clock coupled to said controlling unit and operable for digitizing a received satellite signal, wherein said reference clock signal is provided by said sampling clock.

7. The receiver of claim 1, further comprising:
a real time clock circuit coupled to said controlling unit and operable for providing a local time, wherein said controlling unit is also operable for determining that said counter values are in error if said counter values exceed a predetermined range when a predetermined time period expires according to said local time; and
a sampling clock coupled to said controlling unit and operable for digitizing a received satellite signal, wherein said real time clock circuit is driven by said sampling clock.

8. A method for positioning a satellite navigation system receiver, comprising:
obtaining navigation system time based on navigation message from a satellite;
generating a reference clock signal having a reference clock frequency;
driving a counter by said reference clock signal for providing counter values;
counting, by said counter, in a first interval from a first time point to a second time point to generate a first increment of said counter values, wherein from said first time point to said second time point said satellite navigation system receiver remains turned on;
counting, by said counter, in a second interval from a third time point to a fourth time point to generate a second increment of said counter values, wherein from said third time point to said fourth time point said satellite navigation system receiver is on then turned off and turned on again;
calculating a correction value indicative of a corrected reference clock frequency by dividing said first increment of said counter values during a time period by an increment of said navigation system time during said time period;
generating a calculated navigation system time according to said correction value and said second increment of said counter values; and
employing said calculated navigation system time during calculation of a current position result of said receiver.

9. The method of claim 8, further comprising:
determining navigation bit boundaries according to said calculated navigation system time.

10. The method of claim 8, further comprising:
determining visibility of satellites according to said calculated navigation system time.

11. The method of claim 8, further comprising:
calculating said correction value by calculating an average refresh rate of said counter values over a particular period of said navigation system time.

12. The method of claim 11, further comprising:
generating said calculated navigation system time according to said average refresh rate of said counter values.

13. The method of claim 8, further comprising:
digitizing a received satellite signal with a sampling clock; and
generating said reference clock signal by said sampling clock.

14. The method of claim 8, further comprising:
generating a local time by a real time clock circuit; and
determining that said counter values are in error if said counter values exceed a predetermined range when a predetermined time period expires according to said local time;
digitizing a received satellite signal with a sampling clock; and
driving said real time clock circuit by said sampling clock.

15. A satellite navigation system receiver, comprising:
a radio frequency (RF) front end operable for converting a frequency of a received satellite signal to a desired frequency;
a clock coupled to said RF front end and operable for generating a reference clock signal having a reference clock frequency for driving a counter to generate counter values, wherein said counter is operable for counting in a first interval from a first time point to a second time point to generate a first increment of said counter values and for counting in a second interval from a third time point to a fourth time point to generate a second increment of said counter values, wherein from said first time point to said second time point said satellite navigation system receiver remains turned on, wherein from said third time point to said fourth time point said satellite navigation system receiver is on then turned off and turned on again;
a baseband processing unit coupled to said RF front end and operable for acquiring and tracking satellite signals and for calculating position results of said receiver; and
a controlling unit coupled to said baseband processing unit and operable for calculating a correction value indicative of a corrected reference clock frequency by dividing an increment of said counter values during a time period by an increment of navigation system time during said time period, and also operable for generating a calculated navigation system time according to said correction value and based on a navigation message from a satellite;
wherein said baseband processing unit is operable for employing said calculated navigation system time during calculation of a current position result of said receiver.

16. The receiver of claim 15, wherein said controlling unit calculates said correction value according to the following equation:

$$f_{correct} = \frac{Counter_n - Counter_m}{\text{GPS\_Time}_n - \text{GPS\_Time}_m},$$

wherein $f_{correct}$ represents said correction value, wherein $Counter_n$ represents a second counter value at a second time point, wherein $Counter_m$ represents a first counter value at a first time point, wherein $\text{GPS\_Time}_n$ represents a second navigation system time at said second time point, wherein $\text{GPS\_Time}_m$ represents a first navigation system time at said first time point.

17. The receiver of claim 16, wherein said controlling unit generates said calculated navigation system time according to the following equation:

$$CT_p = \text{GPS\_Time}_o + \frac{(Counter_p - Counter_o)}{f_{correct}},$$

wherein $GPS\_Time_o$ represents a third navigation system time at a third time point, wherein $Counter_p$ represents a fourth counter value at a fourth time point, wherein $Counter_o$ represents a third counter value at said third time point, wherein $f_{correct}$ represents said correction value, wherein $CT_p$ represents said calculated navigation system time which corresponds to said fourth counter value.

18. The receiver of claim 15, wherein said baseband processing unit is operable for determining navigation bit boundaries according to said calculated navigation system time.

19. The receiver of claim 15, wherein said baseband processing unit is operable for determining visibility of satellites according to said calculated navigation system time.

20. The receiver of claim 15, wherein said received satellite signal is digitized by said clock.

21. The receiver of claim 15, further comprising a real time clock circuit coupled to said controlling unit and operable for providing a local time, wherein said controlling unit is also operable for determining that said counter values are in error if said counter values exceed a predetermined range when a predetermined time period expires according to said local time, wherein said received satellite signal is digitized by said clock, and wherein said real time clock circuit is driven by said clock.

\* \* \* \* \*